United States Patent
Huh

(10) Patent No.: US 11,506,149 B2
(45) Date of Patent: Nov. 22, 2022

(54) LEAK DIAGNOSIS SYSTEM USING ACTIVE PURGE PUMP AND LEAK DIAGNOSIS METHOD USING ACTIVE PURGE PUMP

(71) Applicants: Hyundai Motor Company, Seoul (KR); Kia Motors Corporation, Seoul (KR)

(72) Inventor: Jeong-Ki Huh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 283 days.

(21) Appl. No.: 16/688,517

(22) Filed: Nov. 19, 2019

(65) Prior Publication Data

US 2020/0232421 A1    Jul. 23, 2020

(30) Foreign Application Priority Data

Jan. 18, 2019   (KR) .................. 10-2019-0006896

(51) Int. Cl.
| | |
|---|---|
| *F02M 25/08* | (2006.01) |
| *B60K 15/03* | (2006.01) |
| *G07C 5/08* | (2006.01) |
| *G01M 3/32* | (2006.01) |
| *F02M 35/10* | (2006.01) |

(52) U.S. Cl.
CPC ......... *F02M 25/0818* (2013.01); *B60K 15/03* (2013.01); *F02M 25/089* (2013.01); *F02M 25/0836* (2013.01); *F02M 35/10222* (2013.01); *G01M 3/32* (2013.01); *G07C 5/0808* (2013.01); *B60K 2015/0321* (2013.01)

(58) Field of Classification Search
CPC ............. F02M 25/089; F02M 25/0809; F02M 25/0818; F02M 25/0836; F02D 41/22; F02D 2041/225; G01M 15/04; G07C 5/0808; B60K 2015/0321; B60K 15/03504; B60K 15/03519; B60Y 2400/306
USPC .......................................................... 123/520
See application file for complete search history.

(56) References Cited

U.S. PATENT DOCUMENTS

| | | | | |
|---|---|---|---|---|
| 10,480,431 B1 * | 11/2019 | Dudar | .................... | F02D 41/22 |
| 10,760,532 B1 * | 9/2020 | Dudar | ................ | F02D 41/0032 |
| 2002/0066440 A1 * | 6/2002 | Kano | ................... | F02M 25/089 |
| | | | | 123/520 |
| 2002/0162457 A1 * | 11/2002 | Hyodo | .............. | F02M 25/0872 |
| | | | | 96/144 |
| 2003/0110836 A1 * | 6/2003 | Cho | ................... | F02M 25/0818 |
| | | | | 73/40.7 |
| 2006/0144370 A1 * | 7/2006 | Iihoshi | .............. | F02M 25/0809 |
| | | | | 123/491 |

(Continued)

FOREIGN PATENT DOCUMENTS

KR   10-2003-0050120 A    6/2003

*Primary Examiner* — Logan M Kraft
*Assistant Examiner* — Arnold Castro
(74) *Attorney, Agent, or Firm* — Fox Rothschild LLP

(57) ABSTRACT

An evaporated gas leak diagnosis method using an active purge pump is provided to detect a leak of the evaporated gas from a canister in a fuel system. The method includes diagnosing a failure of an active purge pump based on a signal generated by a pressure sensor installed on a vent line that extends from the canister to the atmosphere. The active purge pump is mounted on a purge line for connecting the canister with an intake pipe.

19 Claims, 11 Drawing Sheets

(56) References Cited

U.S. PATENT DOCUMENTS

| | | | |
|---|---|---|---|
| 2013/0319378 A1* | 12/2013 | Haag | B60K 15/03504 |
| | | | 73/40.5 R |
| 2015/0159597 A1* | 6/2015 | Woods | F02M 25/0836 |
| | | | 123/495 |
| 2015/0285171 A1* | 10/2015 | Dudar | F02M 25/0836 |
| | | | 73/114.39 |
| 2016/0108864 A1* | 4/2016 | Tochihara | F02M 25/0809 |
| | | | 123/519 |
| 2016/0258390 A1* | 9/2016 | Makino | B60K 15/03504 |
| 2017/0129329 A1* | 5/2017 | Tochihara | B01D 53/0454 |
| 2017/0152798 A1* | 6/2017 | Casetti | F02D 41/1401 |
| 2017/0152813 A1* | 6/2017 | Casetti | F02D 41/1401 |
| 2017/0167415 A1* | 6/2017 | Tochihara | F02D 41/0042 |
| 2018/0080415 A1* | 3/2018 | Kishi | F02M 25/0818 |
| 2018/0347511 A1* | 12/2018 | Makino | F04D 29/403 |
| 2019/0353119 A1* | 11/2019 | Choi | F02M 25/0854 |
| 2019/0360434 A1* | 11/2019 | Dudar | F02M 25/0854 |
| 2020/0072166 A1* | 3/2020 | Honda | F02M 25/0836 |
| 2020/0149485 A1* | 5/2020 | Asanuma | F02D 41/1454 |
| 2020/0224610 A1* | 7/2020 | Huh | F02M 25/089 |
| 2020/0232422 A1* | 7/2020 | Asanuma | F02M 25/0836 |
| 2021/0033047 A1* | 2/2021 | Shinaberry | F02M 25/0836 |

\* cited by examiner

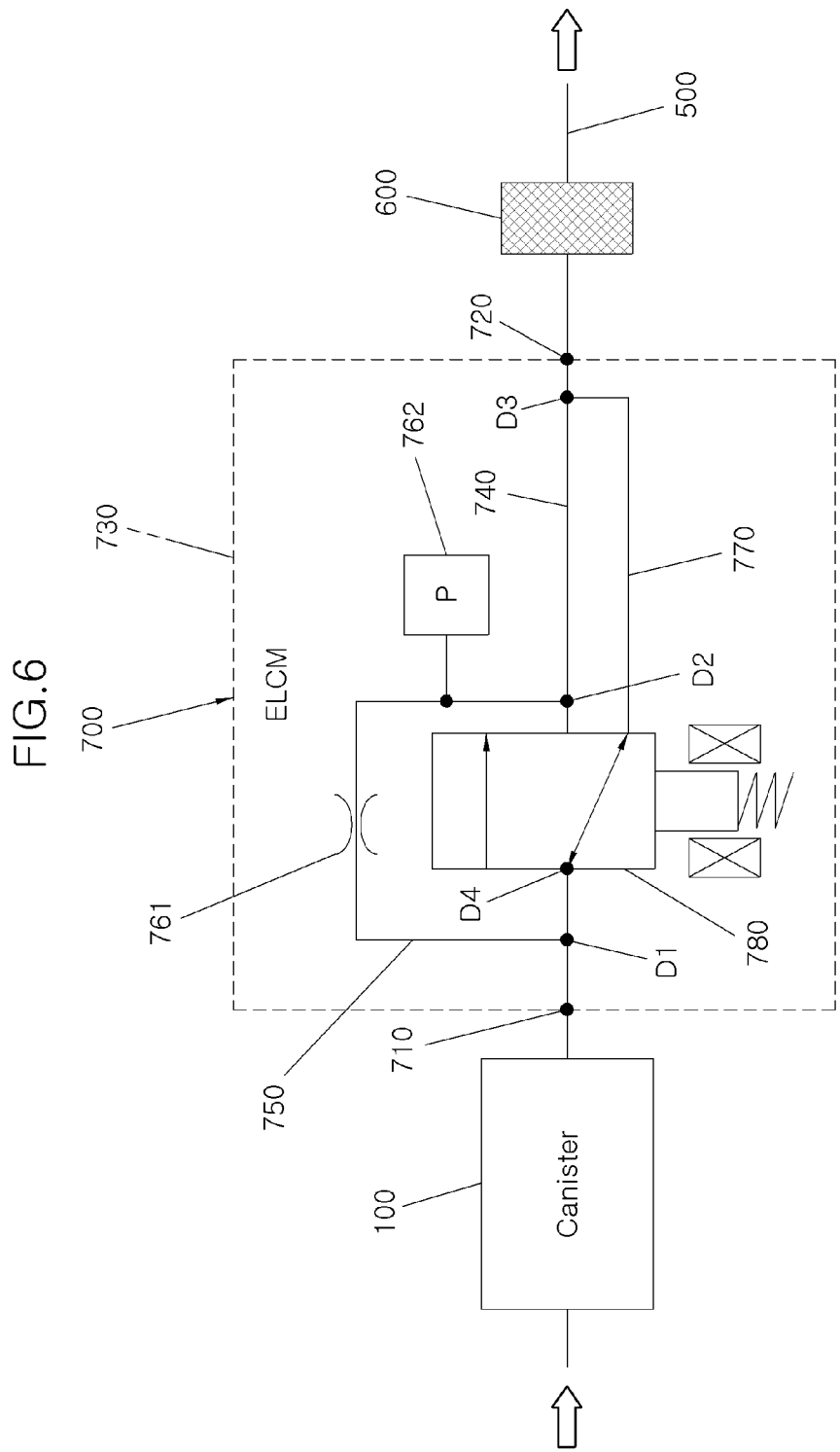

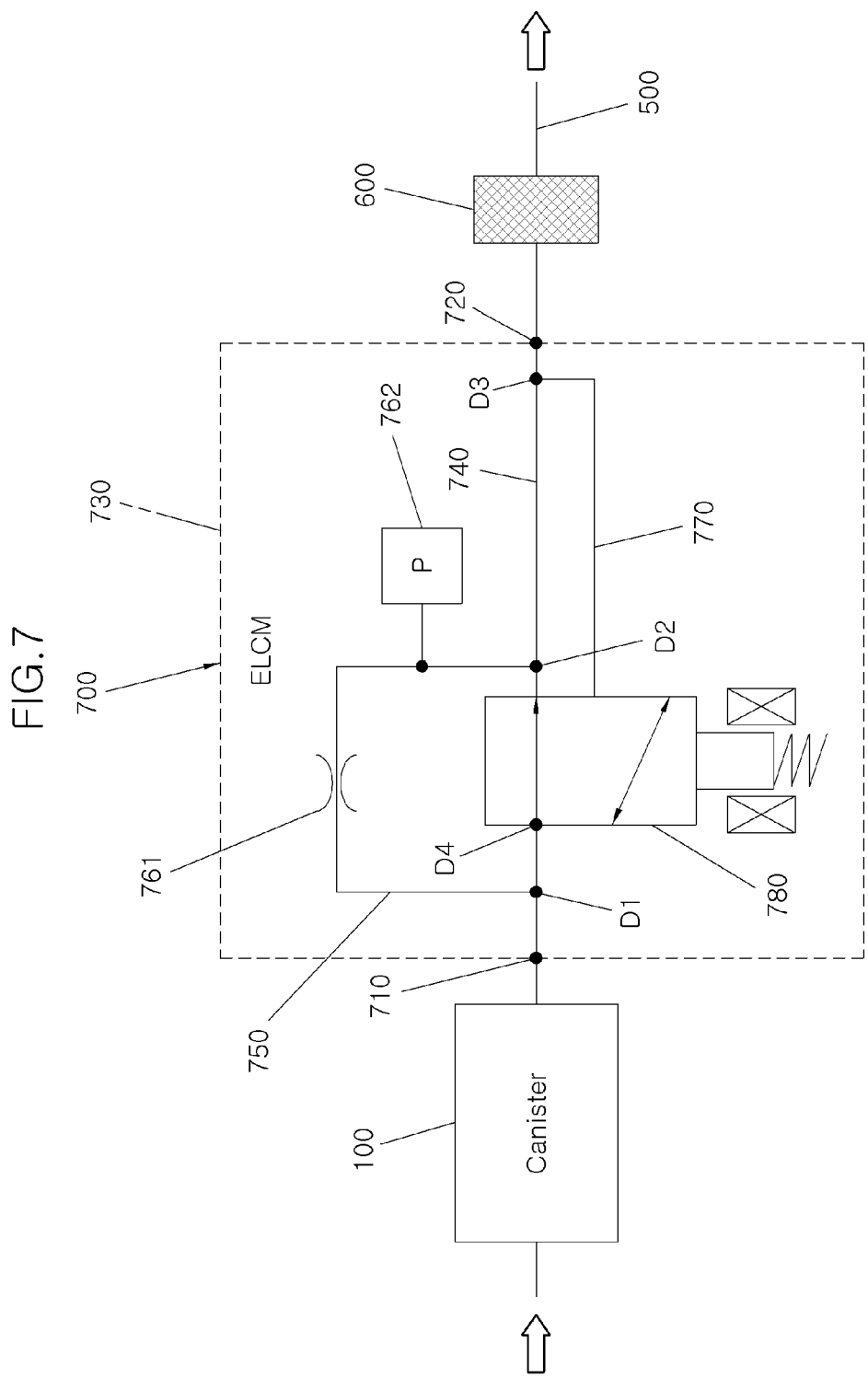

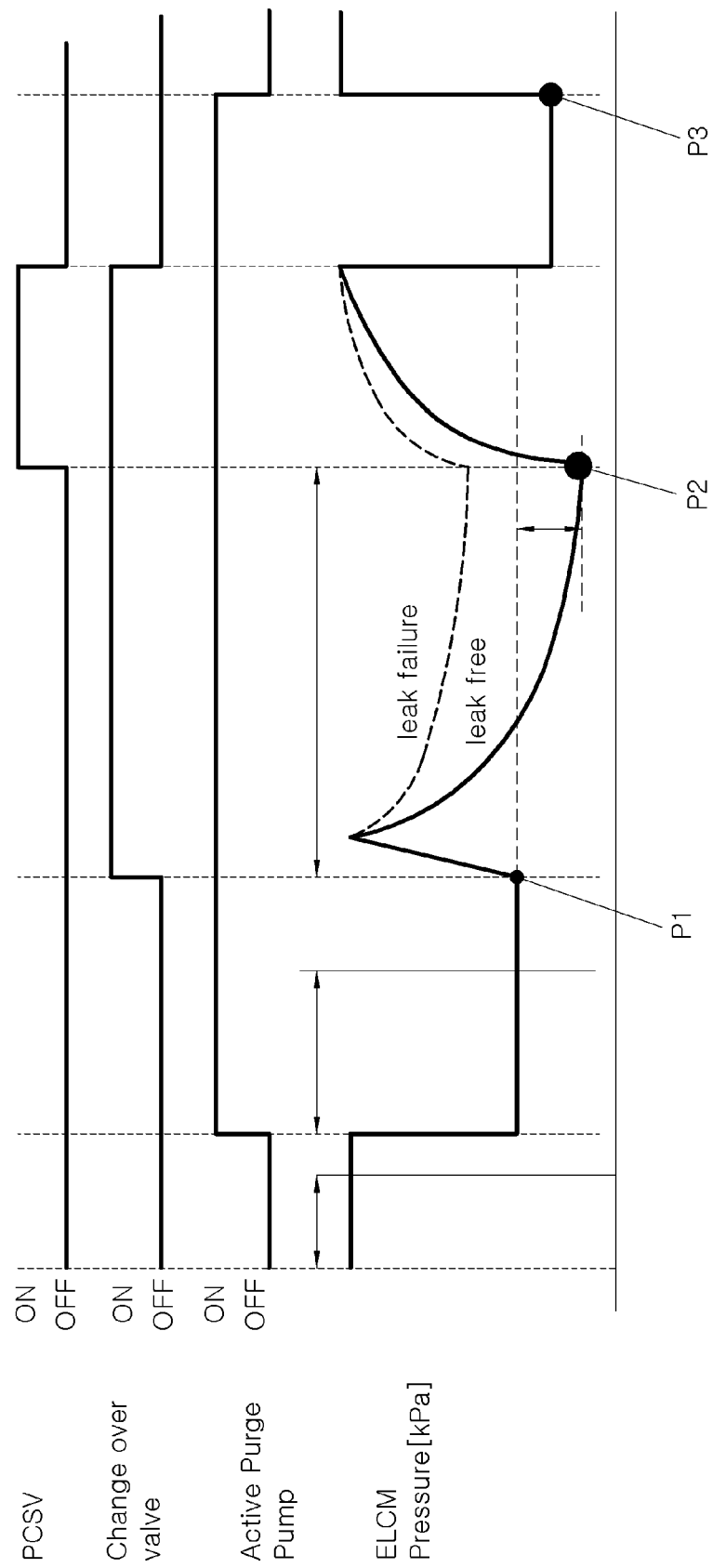

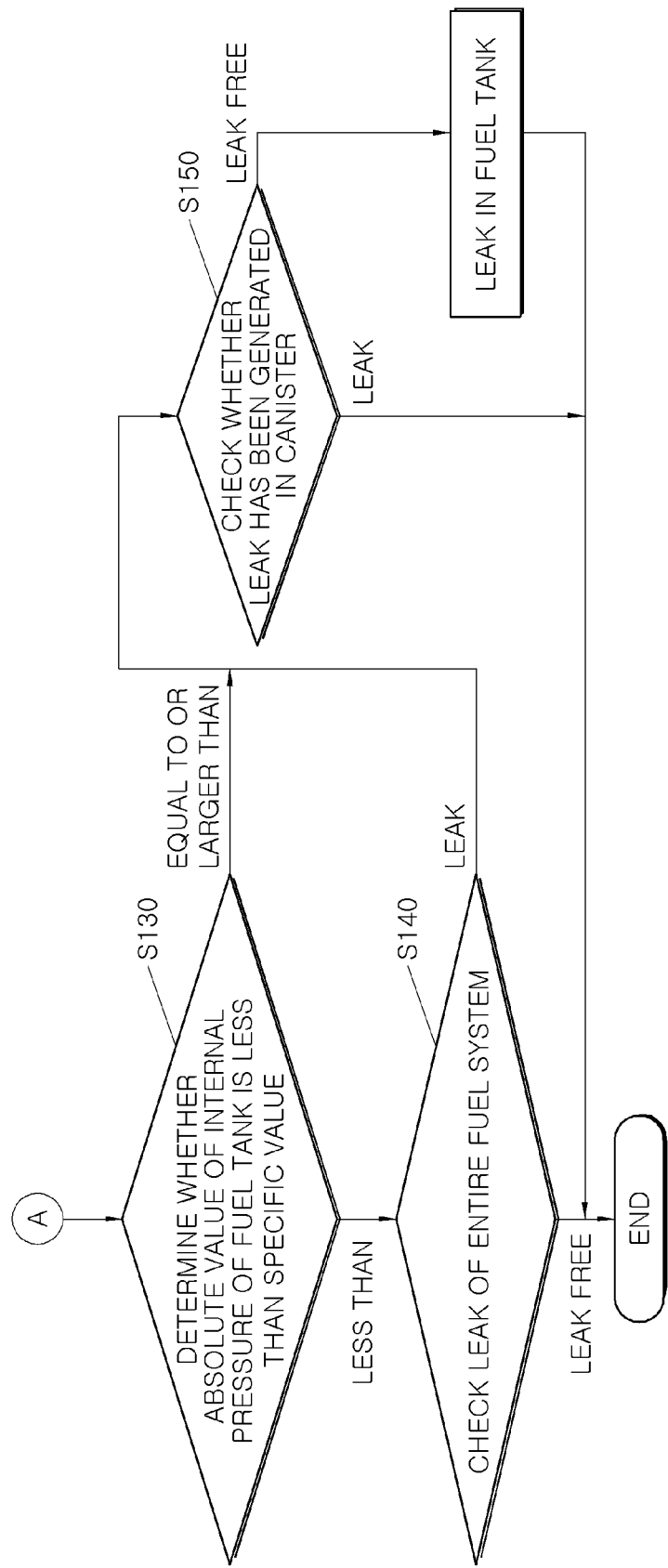

LEAK DIAGNOSIS SYSTEM USING ACTIVE PURGE PUMP AND LEAK DIAGNOSIS METHOD USING ACTIVE PURGE PUMP

CROSS-REFERENCE TO RELATED APPLICATION

This application claims priority to Korean Patent Application No. 10-2019-0006896, filed on Jan. 18, 2019, which is incorporated herein by reference in its entirety.

BACKGROUND

Field of the Disclosure

The present disclosure relates to the leak diagnosis system using an active purge pump and the leak diagnosis method using the active purge pump, and more particularly, to the leak diagnosis system using an active purge pump and the leak diagnosis method using the active purge pump, which pressurize and inject evaporated gas into an intake pipe, and reduce the weight of an evaporative leak check monitor (ELCM) module.

Description of Related Art

In a hybrid vehicle, an internal combustion engine having a relatively small size is mounted within an engine room compared to a general internal combustion engine vehicle. An intake air compressor may be mounted to the internal combustion engine to satisfy a target output or torque of the internal combustion engine. As the intake air compressor is mounted, the internal pressure of the intake pipe is maintained in a state that is equal to or greater than atmospheric pressure.

Accordingly, an evaporated gas purging method of a natural intake engine, which collects the evaporated gas generated in the fuel tank into a canister, and then guides the evaporated gas collected in the canister to an intake air inside the intake pipe by the negative pressure generated in the intake pipe may not be applied to the hybrid vehicle. Accordingly, there is a need for a technology for pressurizing the evaporated gas adsorbed on the canister to inject it into the intake pipe.

Meanwhile, the hybrid vehicle diagnoses the leak of a fuel system using an evaporative leak check monitor (ELCM) module 1 as shown in FIGS. 1 to 3 of the related art. FIG. 4 shows a conventional purging system equipped with the ELCM module 1 according to the related art. As shown in FIG. 1, when a switching valve 2 is not operated, the atmospheric pressure is measured using a pressure sensor 3, and then a vacuum pump 4 is operated to generate the air flow inside the ELCM module 1.

A reference orifice 5 is mounted on the ELCM module 1, and a pressure sensor 3 is mounted at the rear end of the reference orifice 5 with respect to the air flow direction. The flow rate of air flowing into the pressure sensor 3 by the reference orifice 5 becomes constant. Accordingly, the magnitude of a signal generated by the pressure sensor 3 reaches a particular value according to various environmental variables. This particular value is measured as a first reference pressure value (P1).

In addition, as shown in FIGS. 2 and 4, the switching valve 2 is operated to generate the air flow in the fuel system having a canister 6 and a fuel tank 7. The flow rate from the fuel system to the atmosphere is gradually reduced. Accordingly, as shown in FIG. 3, the magnitude of the signal generated by the pressure sensor 3 reaches a particular value, then reduces nonlinearly, and reaches a specific value according to various environmental variables. At this time, the specific value reached is measured as the leak determination value (P2).

When the leak determination value (P2) is measured, a purge control solenoid valve (PCSV) 9 mounted on a purge line 8 is open. Since the outside air flows into the canister 6 through the purge line 8, the aspect of the continuous measurement signal generated through the pressure sensor 3 is changed into a non-linearly increasing form and becomes the same magnitude as the atmospheric pressure measured previously. The failure of the PCSV 9 and the failure of a vacuum pump 4 are diagnosed based on the non-linear change in the signal generated by the pressure sensor 3 when the PCSV 9 has been open.

When the measurement signal from the pressure sensor 3 becomes the same magnitude as the atmospheric pressure, the PCSV 9 is locked and the switching valve 2 is changed to the no-operation state. Since the vacuum pump 4 is operated in a state where the switching valve 2 has not been operated, the air flow is regenerated inside the ELCM module 1. Accordingly, the magnitude of the signal generated by the pressure sensor 3 reaches a particular value according to various environmental variables. This particular value is measured as a second reference pressure value (P3).

Based on the first reference pressure value (P1), the leak determination value (P2), and the second reference pressure value (P3), the state of the ELCM module 1 is determined, and the leak of the fuel system is determined. When the leak determination value (P2) is less than the first reference pressure value (P1), it is determined that there is no leak. When the leak determination value (P2) is greater than the first reference pressure value (P1), it is determined that there is the leak. However, since a motor should be mounted on the ELCM module to operate the vacuum pump 4, it has been difficult to reduce the weight of the ELCM module.

The contents described in section are to help the understanding of the background of the present disclosure, and may include what is not previously known to those skilled in the art to which the present disclosure pertains.

SUMMARY

Accordingly, an object of the present disclosure provides a leak diagnosis system using an active purge pump and a leak diagnosis method using the active purge pump, which may reduce the weight of an ELCM module while pressurizing and injecting evaporated gas adsorbed on a canister into an intake pipe.

An evaporated gas leak diagnosis method using an active purge pump according to an exemplary embodiment of the present disclosure for diagnosing the leak of the evaporated gas from a canister in a fuel system may include diagnosing a failure of an active purge pump based on a signal generated by a pressure sensor installed on a vent line that extends from the canister to the atmosphere, and the active purge pump may be mounted on a purge line for connecting the canister with an intake pipe.

In addition, the active purge pump may be operated in reverse rotation to guide the air from the canister toward the atmosphere. The failure diagnosis of the active purge pump may be performed while checking leak of the evaporated gas in the fuel system. The checking of the leak of the evaporated gas in the fuel system may include measuring an atmosphere pressure by the pressure sensor, measuring a first reference pressure value by circulating the air inside the vent line, and measuring the leak determination value by discharging the air inside the canister and a fuel tank to the outside, and in checking the leak of the evaporated gas in the fuel system, the active purge pump may be operated in reverse rotation to guide the air from the canister toward the atmosphere.

Further, after measuring the leak determination value, the diagnosing of the failure of the active purge pump may be performed. After measuring the leak determination value, the failure of the active purge pump may be diagnosed based on a change in the signal generated by the pressure sensor when a PCSV has been open. Prior to checking the leak of the evaporated gas in the fuel system, whether an engine has been stopped may be determined. In addition, prior to checking the leak of the evaporated gas in the fuel system, whether an intake air compressor has been stopped is performed may be determined.

A leak diagnosis method using an active purge pump according to an exemplary embodiment of the present disclosure may include operating in reverse rotation an active purge pump mounted on a purge line that connects a canister with an intake pipe, determining whether an absolute value of the internal pressure of a fuel tank is less than a specific value, and checking the leak of evaporated gas in a fuel system having the canister and the fuel tank.

In addition, when the absolute value of the internal pressure of the fuel tank is greater than the specific value, whether the leak has been generated in the canister may be checked. When it is determined that the leak is generated in the fuel system, whether the leak has been generated in the canister may be detected. In addition, in response to determining that there is no leak in the canister, the leak may be determined to have been generated in the fuel tank.

Prior to operating in reverse rotation the active purge pump, a failure of the active purge pump may be diagnosed using a first pressure gauge or a second pressure gauge mounted on the purge line. In addition, the failure of the active purge pump may be determined based on a signal generated by the first pressure gauge mounted on the front end of the active purge pump or a signal generated by the second pressure gauge mounted on the rear end thereof.

An operation of the active purge pump may be prohibited upon the failure of the active purge pump. The failure of the active purge pump may be detected from a signal generated by a pressure sensor installed on a vent line while performing the checking of the leak of the evaporated gas in the fuel system. In particular, the failure of the active purge pump may be diagnosed based on the change in the signal generated by the pressure sensor when a PCSV has been open.

A leak diagnosis system using an active purge pump according to an exemplary embodiment of the present disclosure for achieving the object may include a canister connected with a fuel tank to adsorb evaporated gas, a purge line that connects the canister with an intake pipe, an active purge pump and a PCSV mounted on the purge line, a vent line that connects the canister with the atmosphere, and an ELCM module and a filter mounted on the vent line, and the evaporated gas collected in the canister may be forcibly injected into the intake pipe by the forward-rotation operation of the active purge pump and the adjustment of the opening amount of the PCSV, and the leak of the canister and the fuel tank may be checked by the reverse-rotation operation of the active purge pump and a change in the flow path inside the ELCM module.

In addition, a first pressure gauge may be mounted on the purge line to be disposed between the active purge pump and the PCSV, and a second pressure gauge may be mounted on the purge line to be disposed between the canister and the active purge pump. The ELCM module may include a switching valve for changing the connection between a plurality of flow paths formed therein. The air may be circulated inside the ELCM module by the vacuum pressure generated by the active purge pump at non-operation of the switching valve, and the air inside the canister and the fuel tank may be discharged into the atmosphere by the vacuum pressure generated by the active purge pump at operation of the switching valve. In addition, the active purge pump may have the pressing direction or the generated vacuum pressure changed by the adjustment of the rotation direction or the adjustment of the revolutions per minute (RPM).

According to the leak diagnosis system using the active purge pump and the leak diagnosis method using the active purge pump according to an exemplary embodiment of the present disclosure configured as described above, it may be possible to pressurize and inject the evaporated gas into the intake pipe by the adjustment of the RPM of the active purge pump and the opening amount of the PCSV, and the leak of the fuel system having the fuel tank and the canister may be detected by the adjustment of the rotational direction of the active purge pump, the adjustment of the RPM, or the change in the flow path of the ELCM module. In addition, it may be possible to diagnose the leak of the fuel system even when the engine is stopped.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein:

FIGS. 6 and 7 are diagrams showing an operational state of an ELCM module of FIG. 5 according to an exemplary embodiment of the present disclosure;

FIG. 8 is a graph of a signal generated by a pressure sensor mounted on the ELCM module of FIG. 5 according to an exemplary embodiment of the present disclosure; and FIGS. 9A, 9B and 10 are flowcharts of the leak diagnosis method using the active purge pump according to an exemplary embodiment of the present disclosure.

DETAILED DESCRIPTION

Figure 1:
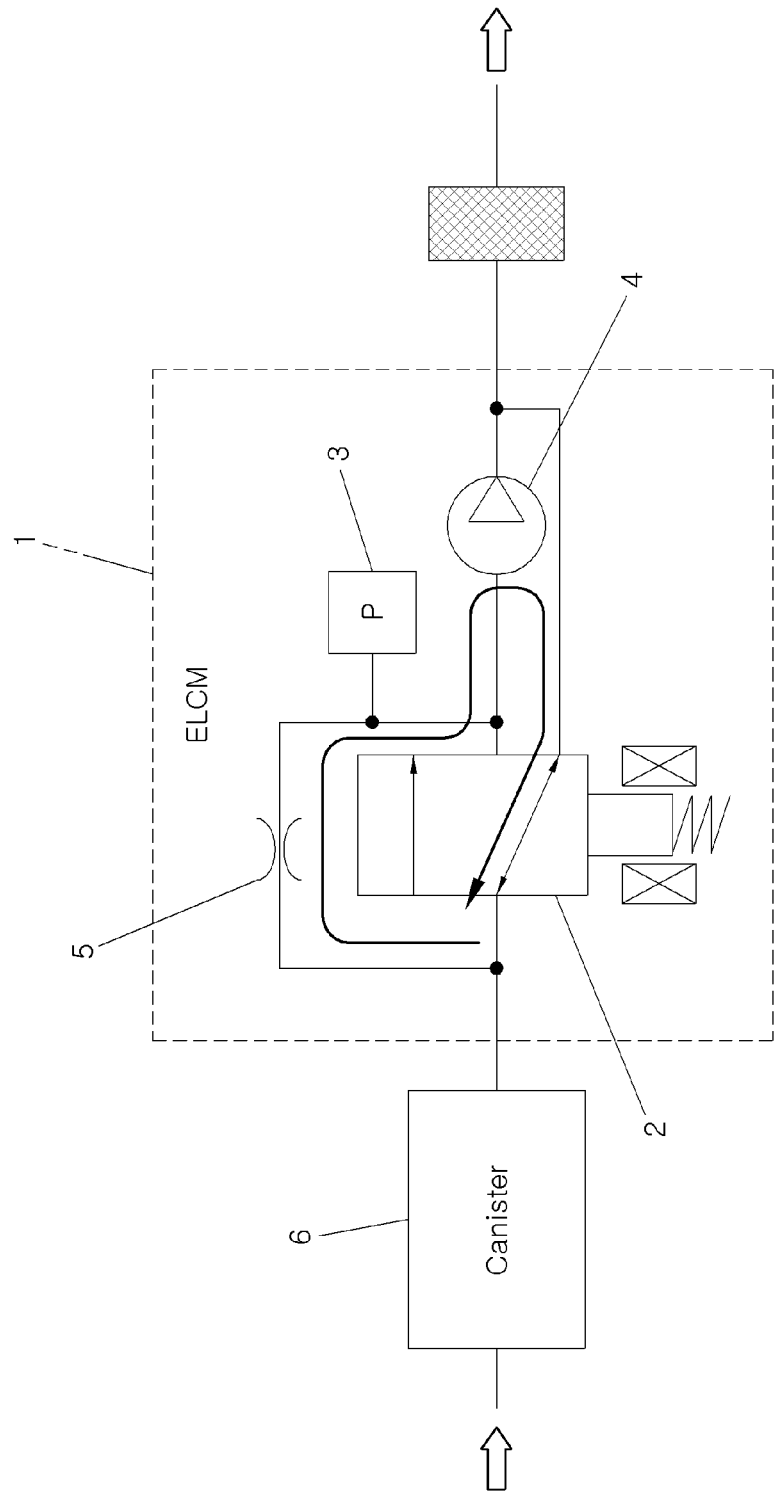
FIGS. 1 and 2 are diagrams showing an operational state of a conventional ELCM module according to the related art.
Figure 2:
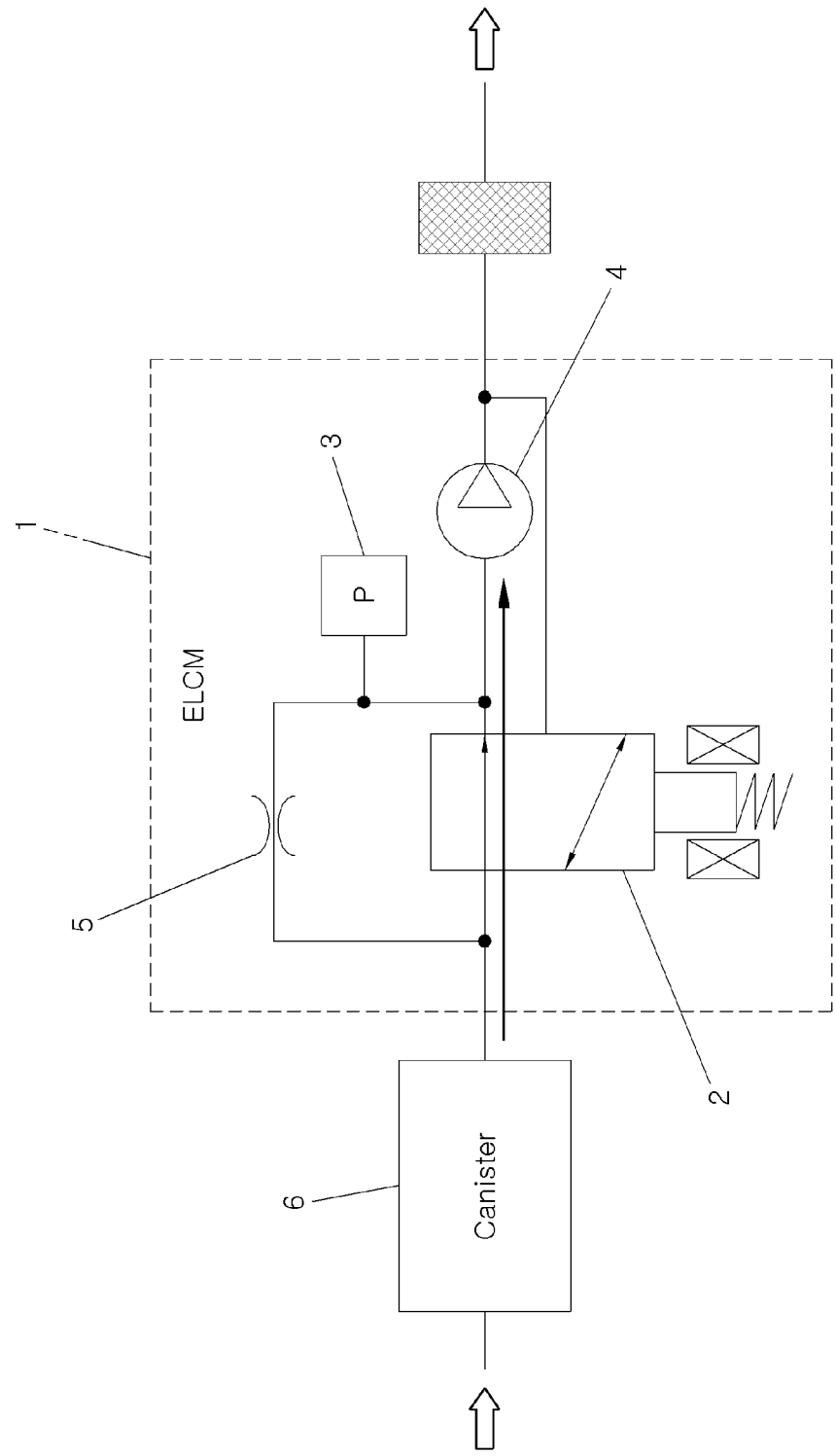
Figure 3:
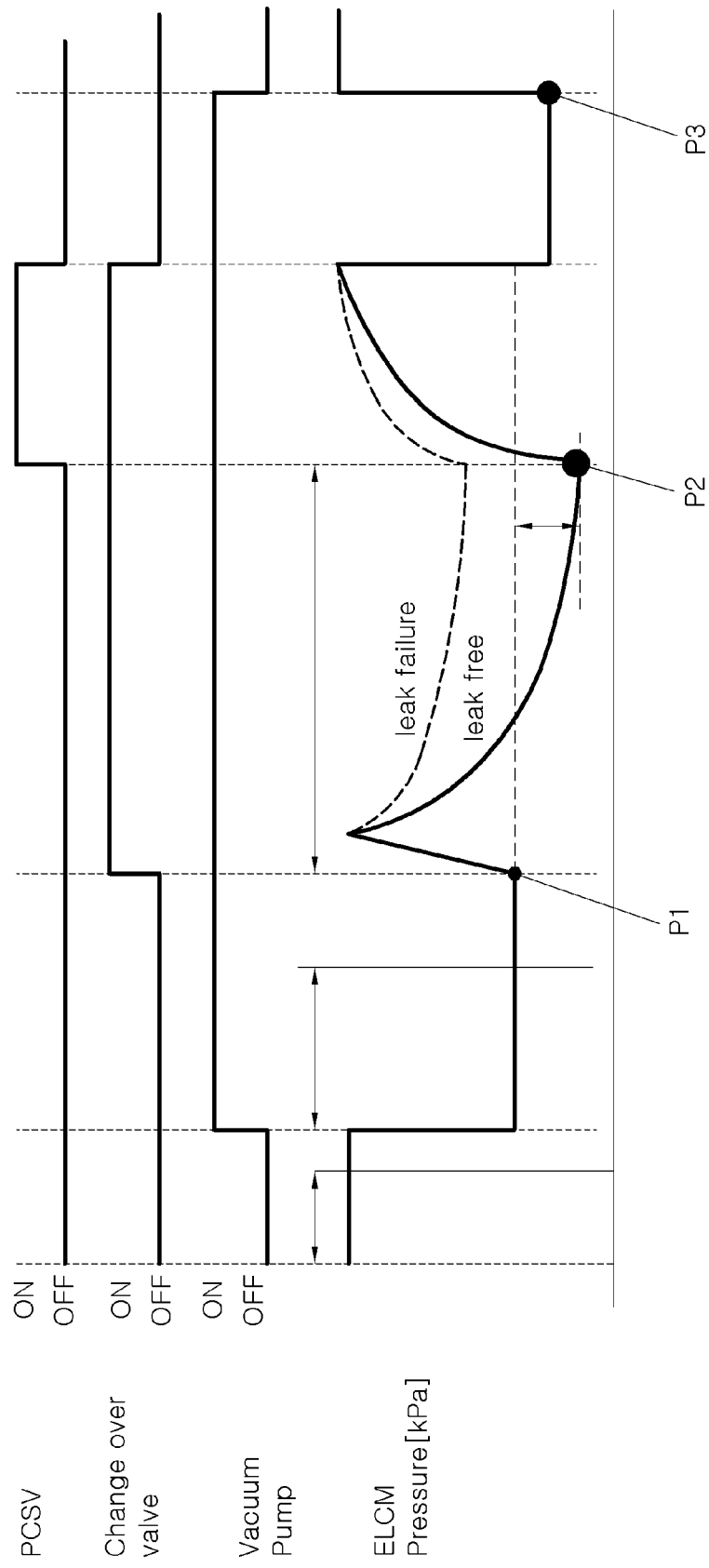
FIG. 3 is a graph of a signal generated by a pressure sensor mounted on an ELCM module of FIGS. 1 and 2 according to the related art.
Figure 4:
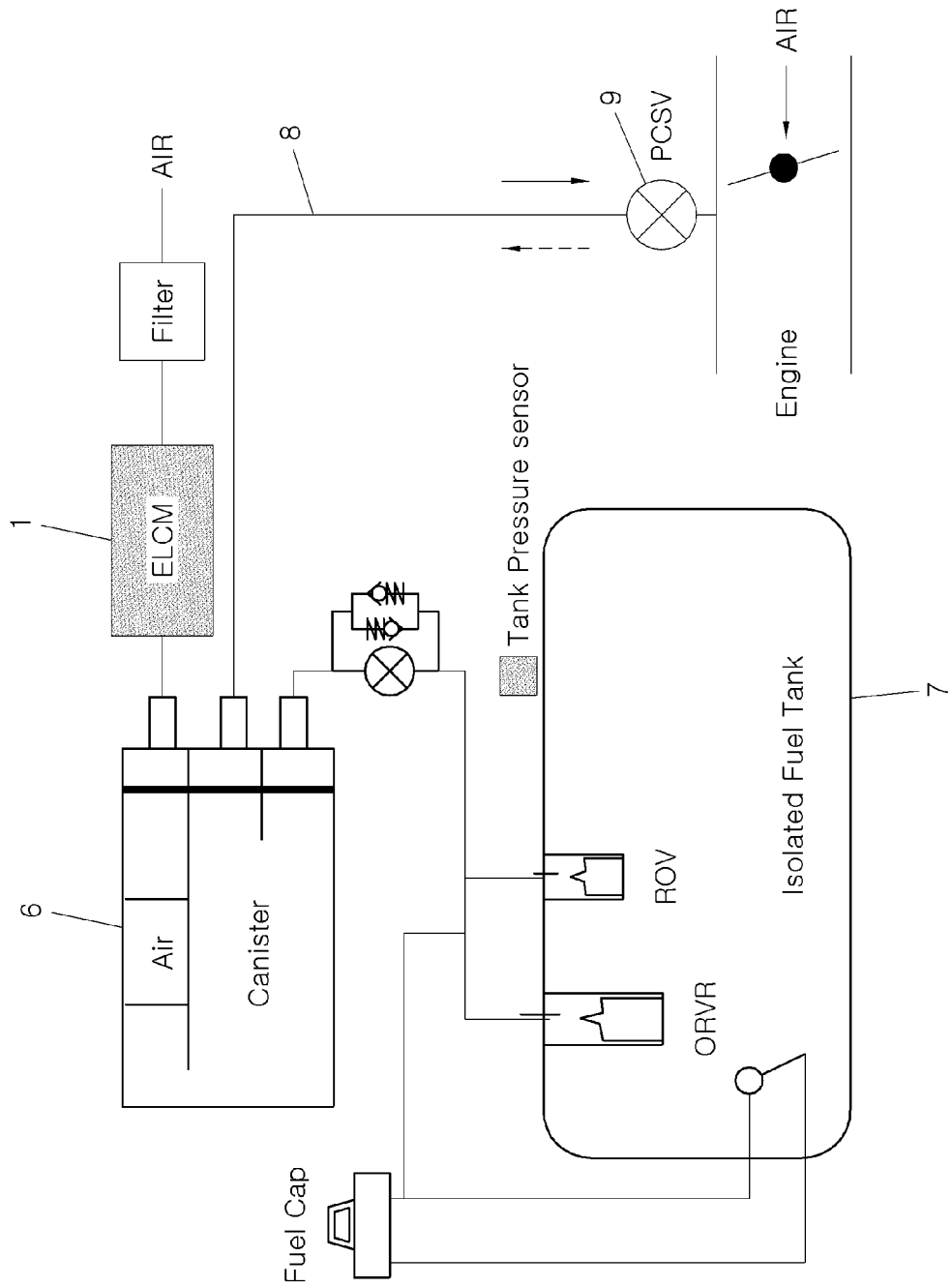
FIG. 4 is an exemplary diagram of a conventional purge system mounted with an ELCM module according to the related art.
Figure 5:
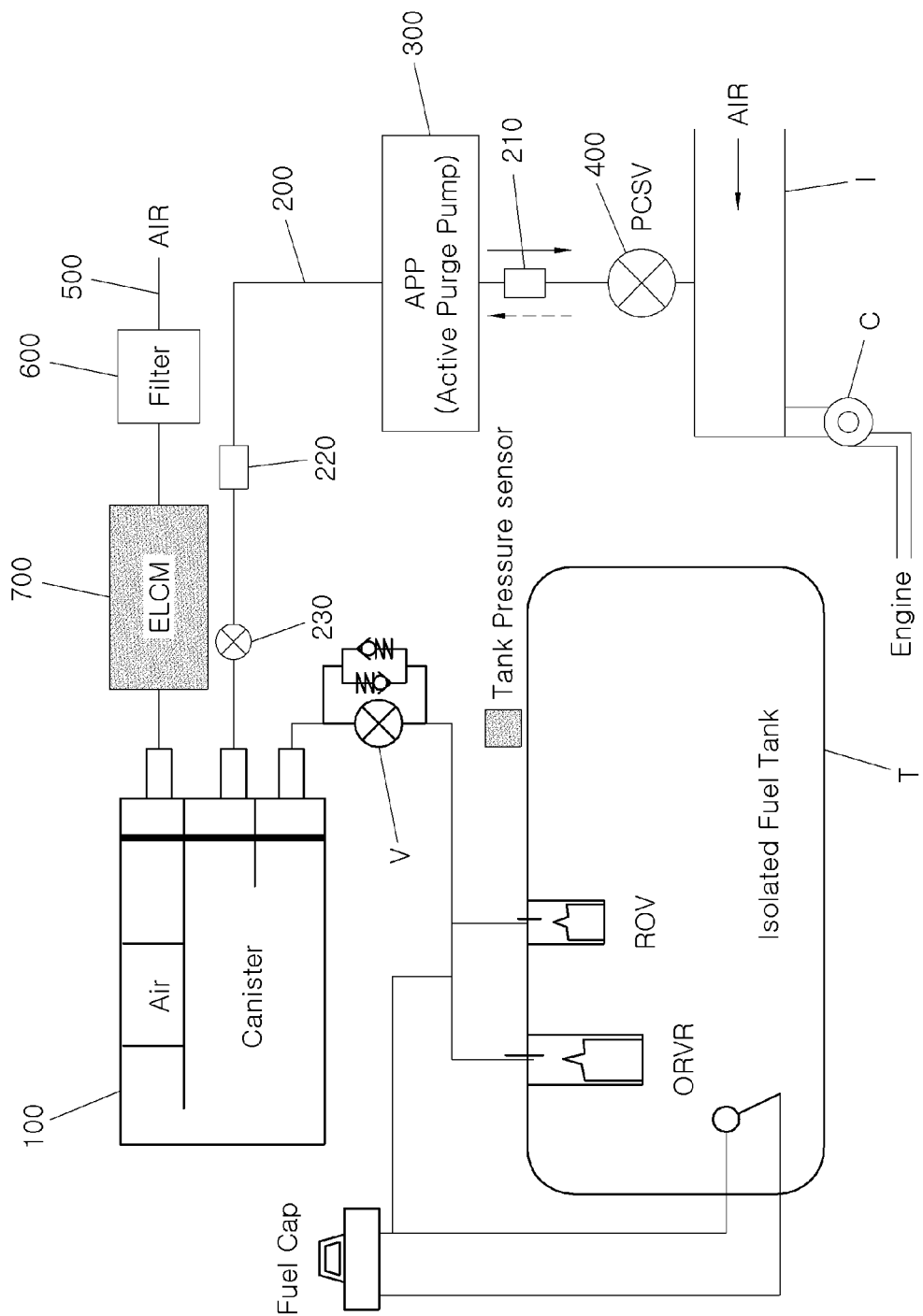
FIG. 5 is an exemplary diagram of the leak diagnosis system using an active purge pump according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the leak diagnosis system using an active purge pump and the leak diagnosis method using the active purge pump will be described with reference to the accompanying drawings.

As shown in FIGS. 5 to 8, the leak diagnosis system using an active purge pump according to an exemplary embodiment of the present disclosure may include a canister 100 connected with a fuel tank (T) to adsorb evaporated gas, a purge line 200 that connects the canister 100 with an intake pipe (I), an active purge pump 300 and a purge control solenoid valve (PCSV) 400 mounted on the purge line 200, a vent line 500 that connects the canister 100 with the atmosphere, and an evaporative leak check monitor (ELCM) module 700 and a filter 600 mounted on the vent line 500. The evaporated gas collected in the canister 100 may be forcibly injected into the intake pipe (I) by the forward rotation operation of the active purge pump 300 and the adjustment of the opening amount of the PCSV 400, and the leak of the canister 100 and the fuel tank (T) may be detected (e.g., checked) by the reverse rotation operation of the active purge pump 300 and a change in the flow path inside the ELCM module 700.

A first pressure gauge 210 may be mounted on the purge line 200 to be positioned between the active purge pump 300 and the PCSV 400, and a second pressure gauge 220 may be mounted on the purge line 200 to be positioned between the canister 100 and the active purge pump 300. In the active purge pump 300, the pressing direction or the generated vacuum pressure may be changed by adjusting the rotation direction or by adjusting the revolutions per minute (RPM). The active purge pump 300 may be operated (by a controller) in the forward rotation to generate air flow from the active purge pump 300 to the PCSV 400 when purging the evaporated gas. Additionally, the active purge pump 300 may be operated (by the controller) in the reverse rotation to generate air flow from the active purge pump 300 to the canister 100 when diagnosing the leak of the fuel system.

When purging the evaporated gas collected in the canister 100, the active purge pump 300 may be operated in a forward rotation to generate a vacuum pressure in the canister 100, and the evaporated gas may be compressed between the PCSV 400 and the active purge pump 300. As the evaporated gas is compressed between the PCSV 400 and the active purge pump 300, the pressure of the evaporated gas may be equal to or greater than the atmospheric pressure. Accordingly, even when an intake air compressor (C) is installed in the intake pipe (I), the evaporated gas may be injected into the intake pipe (I). The intake air compressor (C) may be a turbocharger or a supercharger.

In particular, by adjusting the RPM of the active purge pump 300, the opening/closing timing of the PCSV 400 and the opening amount of the PCSV 400, the amount of evaporated gas flowing into the intake pipe (I) may be adjusted. In particular, the concentration of hydrocarbon concentrated between the active purge pump 300 and the PCSV 400 may be adjusted by adjusting the pressure difference between the front end and the rear end of the active purge pump 300. Accordingly, as the evaporated gas flows into the intake pipe (I), the amount of hydrocarbon additionally supplied to a combustion chamber may be adjusted. When the fuel injection amount and the amount of hydrocarbon additionally supplied to the combustion chamber are adjusted compositely, rich combustion may be prevented. It may thus be possible to minimize the generation of pollutants by the purging of the evaporation gas.

The ELCM module 700 may include a switching valve 780 for changing the connection between a plurality of flow paths formed therein. Air is circulated inside the ELCM module 700 by the vacuum pressure generated by the active purge pump 300 when the switching valve 780 is not operated. The air inside the canister 100 and the fuel tank (T) may be discharged to the atmosphere by the vacuum pressure generated by the active purge pump 300 when the switching valve 780 is operated.

Referring to FIGS. 6 and 7, the ELCM module 700 may include a first port 710 connected with the canister 100, a second port 720 connected with the filter 600 toward the atmosphere, a housing 730 having the first port 710 and the second port 720 formed outside, a first flow path 740 formed inside the housing 730 to connect the first port 710 and the second port 720. Additionally, the ELCM module 700 may include a second flow path 750 for connecting a first branch point (D1) and a second branch point (D2) on the first flow path 740, a reference orifice 761 and a pressure sensor 762 formed on the second flow path 750, a third flow path 770 formed to connect a third branch point (D3) and a fourth branch point (D4) on the first flow path 740, and a switching valve 780 mounted on the first flow path 740 and the third flow path 770 to disconnect the first flow path 740 and connect the third branch point (D3) and the fourth branch point (D4) at non-operation, and to disconnect the third flow path 770 and connect the fourth branch (D4) and the second branch point (D2) at operation.

Referring to FIGS. 6 and 8, the pressure sensor 762 mounted to the ELCM module 700 may be configured to measure the atmospheric pressure when diagnosing the leak of the fuel tank (T) and the canister 100. In addition, the active purge pump 300 may be configured to generate a vacuum pressure in a section between the active purge pump 300 and the PCSV 400 of the purge line 200, and generate the air flow toward the canister 100. The air guided to the vent line 500 through the canister 100 may flow into the ELCM module 700.

The air flowing into the first port 710 may flow into the second flow path 750 through the first branch point (D1). The flow rate may be maintained constant as the air reaching the pressure sensor 762 passes through the reference orifice 761. Since the flow rate of air reaching the pressure sensor 762 may be constant, the magnitude of the signal generated by the pressure sensor 762 may reach a constant value according to various environmental variables. The reached value may be measured as the first reference pressure value (P1).

The air may flow into the first flow path 740 through the second branch point (D2), and then flow into the third flow path 770 through the third branch point (D3). The air flowing into the third flow path 770 from the first flow path 740 may flow into the first flow path 740 through the switching valve 780 and the fourth branch point (D4), and flow into the second flow path 750 again through the first branch point (D1). Accordingly, the air flow of the second flow path 750, the rear end of the first flow path 740 with respect to the switching valve 780, the third flow path 770, the front end of the first flow path 740 with respect to the switching valve 780, and the second flow path may be repeated inside the ELCM module 700 by an operation of the active purge valve 300.

As shown in FIGS. 7 and 8, after the first reference pressure value (P1) is measured, the switching valve 780 may be operated. The air flow generated in the canister 100 and the fuel tank (T) by the operation of the active purge pump 300 may be discharged to the atmosphere through the first port 710, the front end of the first flow path 740 with respect to the switching valve 780, the switching valve 780, the rear end of the first flow path 740 with respect to the switching valve 780, the second port 720, the filter 600, and the vent line 500. The signal generated continuously in the pressure sensor 762 reaches a particular value, then reduces nonlinearly according to various environmental variables, and reaches a specific value. At this time, the specific value reached may be measured as the leak determination value (P2).

After the leak determination value (P2) is measured, the PCSV 400 may be operated to open. As the PCSV 400 is opened, the outside air may flow into the purge line 200. As the outside air flows into the purge line 200, the signal continuously generated by the pressure sensor 762 increases nonlinearly according to various environmental variables, and then becomes the same magnitude as the signal generated when measuring the atmospheric pressure. The failure of the PCSV 400 and the failure of the active purge pump 300 may be diagnosed or detected based on the non-linear change in the signal generated by the pressure sensor 762 in a state where the PCSV 400 has been open.

When the signal continuously generated by the pressure sensor 762 becomes the same magnitude as the signal generated when measuring the atmospheric pressure, the switching valve 780 may be operated to be in the no-operation state, and the PCSV 400 may also be operated to be closed. Since the switching valve 780 is in the no-operation state, air circulation may be regenerated in the ELCM module 700, and according to various environmental variables, the magnitude of the signal generated by the pressure sensor 762 may reach a constant value.

This reached value may be measured as the second reference pressure value (P3). The malfunction of the ELCM module 700 may be detected or checked by comparing the first reference pressure value (P1) with the second reference pressure value (P3). When the leak determination value (P2) is less than the first reference pressure value (P1), it may be determined that there is no leak in the fuel system. When the leak determination value (P2) is greater than the first reference pressure value (P1), a leak may be detected in the fuel system.

Figure 9A:
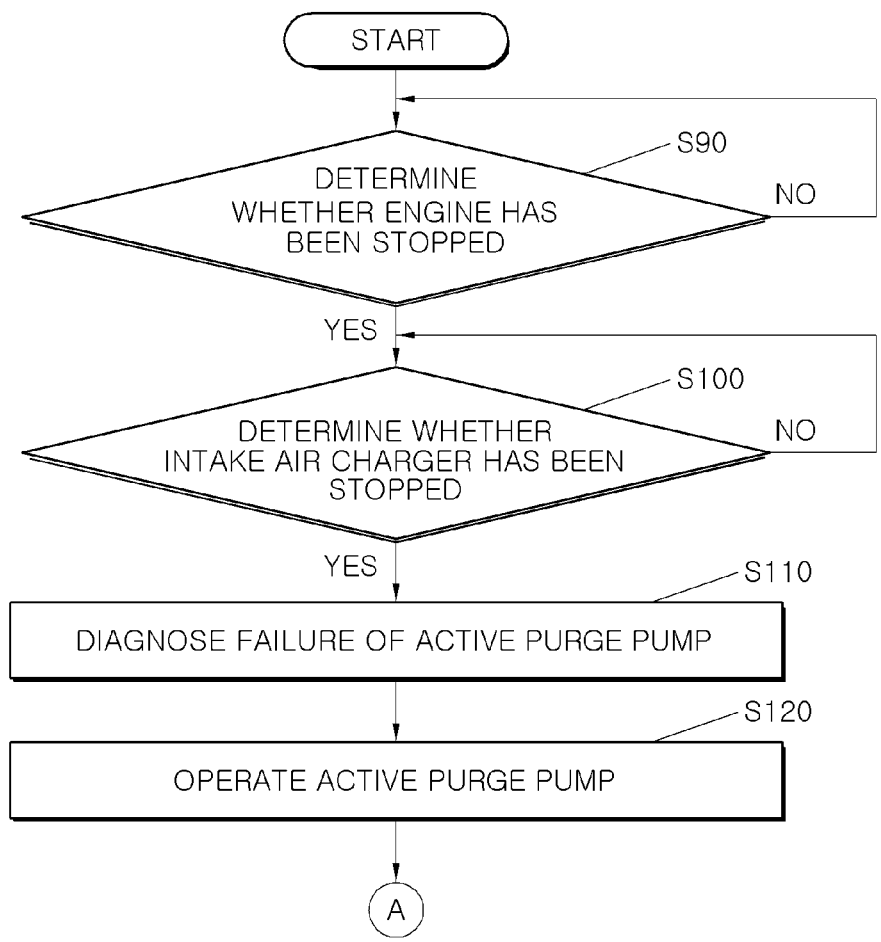
Figure 10:
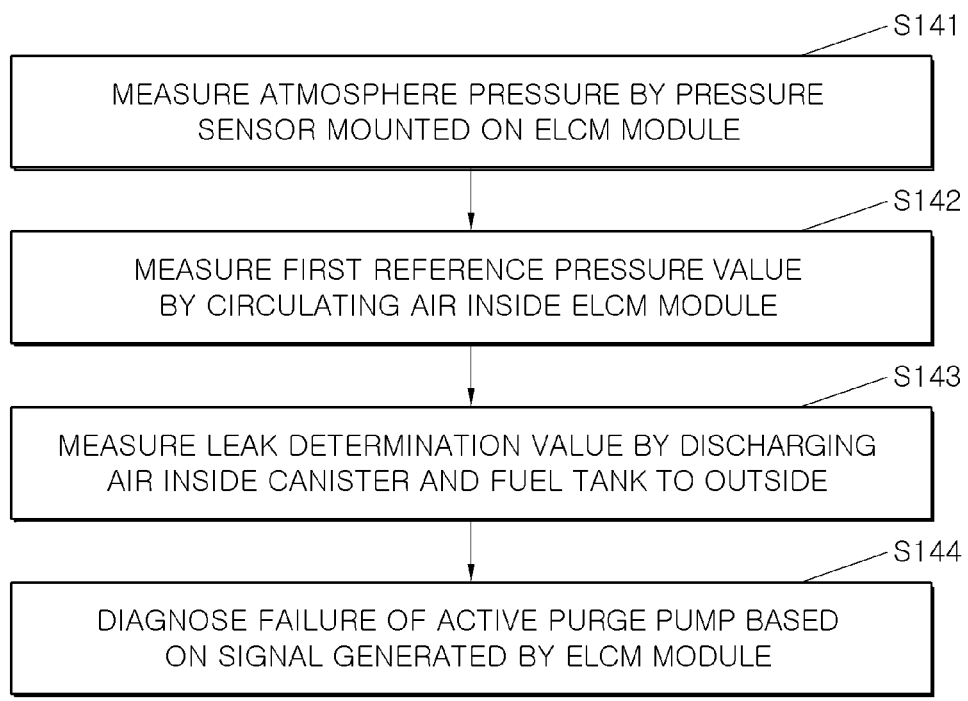

A leak diagnosis system using the active purge pump according to an exemplary embodiment of the present disclosure configured as described above diagnoses the leak of the fuel system according to flowcharts shown in FIGS. 9 and 10. The method described herein below may be executed by a controller. As shown in FIGS. 9 and 10, the leak diagnosis method using the active purge pump according to an exemplary embodiment of the present disclosure may include determining whether an engine has been stopped (operation S90), determining whether the intake air compressor (C) has been stopped (operation S100), diagnosing the failure of the active purge pump 300 using the first pressure gauge or the second pressure gauge mounted on the purge line (operation S110), operating the active purge pump 300 mounted on the purge line 200 for connecting the canister 100 with the intake pipe (I) (operation S120), determining whether the absolute value of the internal pressure of the fuel tank (T) is less than a specific value (operation S130), and detecting the leak of the evaporated gas in the fuel system having the canister 100 and the fuel tank (T) (operation S140).

The determination of whether the engine has been stopped (operation S90) may include determining whether the engine has been stopped based on various signals received by an engine controller. For example, the engine may be determined to have been stopped when there is no air flow in the intake pipe (I) and an exhaust pipe, based on the signal received by a throttle valve and the signal received by a lambda sensor mounted on the exhaust pipe.

Additionally, the determination of whether the intake air compressor (C) has been stopped (operation S100) confirms the stop of the intake air compressor (C). As the intake air compressor (C) is stopped, the pressure inside the intake pipe (I) becomes an atmospheric pressure state. The controller may be configured to determine the stop of the intake air compressor (C) based on the signal received by the intake air compressor (C), the signal received from the sensor mounted on the intake pipe (I) or the exhaust pipe.

In the diagnosing of the failure of the active purge pump 300 using the first pressure gauge or the second pressure gauge mounted on the purge line (operation S110), the failure of the active purge pump 300 may be determined based on the signal generated by the first pressure gauge 210 and the second pressure gauge 220 mounted on the front end and the rear end of the active purge pump 300. Particularly, the diagnosing of the failure of the active purge pump 300 using the first pressure gauge or the second pressure gauge mounted to the purge line (operation S110) may include increasing a pressure in a section between the PCSV 400 and the active purge pump 300 of the purge line 200 by rotating the active purge pump 300 forward in a state where the PCSV 400 has been closed, and then detecting the amount of pressure increased through the first pressure gauge 210.

Alternatively, the controller may be configured to close the valve 230 mounted on the purge line 200 to be positioned between the canister 100 and the second pressure gauge 220, increase a pressure of a section between the valve 230 and the active purge pump 300 of the purge line 200 by rotating the active purge pump 300 in reverse, and then detect the amount of pressure increased using the second pressure gauge 220. Further, in the diagnosing of the failure of the active purge pump 300 using the first pressure gauge or the second pressure gauge mounted on the purge line (operation S110), in response to determining that the active purge pump 300 has failed, the operation of the active purge pump 300 may be blocked. The failure of the active purge pump 300 may be output to the driver as a notification through a display mounted to the vehicle.

The operating of the active purge pump 300 (operation S120), as described above, measures the atmospheric pressure using the pressure sensor 762. In addition, as the active purge pump 300 rotates in reverse, the air flow may be generated from the active purge pump 300 to the canister 100 and the fuel tank (T). The magnitude of pressure generated in the canister 100, the fuel tank (T), the ELCM module 700, and the vent line 500 may be adjusted by adjusting the RPM of the active purge pump 300.

The determination of whether the absolute value of the internal pressure of the fuel tank (T) is less than a specific value (operation S130) senses the internal pressure of the fuel tank (T) using the pressure gauge mounted on the fuel tank (T). The absolute value of the sensed internal pressure of the fuel tank (T) may be compared with a predetermined specific value. When the absolute value of the internal pressure of the fuel tank (T) is less than a specific value, the leak of the evaporated gas may be detected in the fuel system having the canister 100 and the fuel tank (T) (operation S140).

The detecting of the leak of the evaporated gas in the fuel system, as described above, measures the first reference pressure value (P1) by circulating the air inside the ELCM module 700. Additionally, the detecting of the leak of the evaporated gas in the fuel system measures the leak determination value (P2) by operating the switching valve 780 and measures the second reference pressure value (P3) by operation to prevent operation of the switching valve 780. In addition, the detection of the leak of the evaporated gas in the fuel system determines the failure of the ELCM module 700 and the leak of the fuel system by comparing the first reference pressure value (P1), the leak determination value (P2), and the second reference pressure value (P3).

Referring to FIG. 10, the detection of the leak of the evaporated gas in the fuel system (operation S140) includes measuring the atmosphere pressure by the pressure sensor 762 mounted on the ELCM module 700 (operation S141), measuring the first reference pressure value (P1) by circulating the air inside the ELCM module 700 (operation S142), measuring the leak determination value (P2) by discharging the air inside the canister 100 and the fuel tank (T) to the outside (operation S143), and diagnosing or detecting the failure of the active purge pump 300 based on the signal generated by the ELCM module 700 (operation S144).

As described above, in the detection of the leak of the evaporated gas in the fuel system (operation S140), the active purge pump 300 may be operated to move air toward the atmosphere in the canister 100. The active purge pump 300 may be rotated in reverse to achieve the movement of air from the canister 100 toward the atmosphere. The diagnosing of the failure of the active purge pump 300 (operation S144) diagnoses the failure of the active purge pump 300 based on the aspect of the non-linear change of the signal generated by the pressure sensor 762 in a state where the PCSV 400 has been open.

In response to determining, in the determination of whether the absolute value of the internal pressure in the fuel tank (T) is less than the specific value (operation S130), that the absolute value of the internal pressure in the fuel tank (T) is greater than the specific value, or determining, in the detection of the leak of the evaporated gas in the fuel system (operation S140), that there is the leak, the detection of whether the leak has been generated in the canister 100 (operation S150) may be performed. Particularly, in the detection of whether the leak has been generated in the canister 100 (operation S150), the measurement target may be limited to the canister 100. Accordingly, the valve (V) mounted on the line for connecting the canister 100 with the fuel tank (T) may be closed, to prevent the air flow due to the operation of the active purge pump 300 from being generated in the fuel tank (T).

Further, the detection of whether the leak has been generated in the canister 100 (operation S150), as described above, measures the first reference pressure value (P1) by circulating the air inside the ELCM module 700 and measures the leak determination value (P2) by operating the switching valve 780. The detection of whether the leak has been generated in the canister 100 (operation S150) also measures the second reference pressure value (P3) by preventing operation of the switching valve 780.

In addition, the detection of whether the leak has been generated in the canister 100 (operation S150) determines the failure of the ELCM module 700 and the leak of the canister 100 by comparing the first reference pressure value (P1), the leak determination value (P2), and the second reference pressure value (P3). The detection of whether the leak has been generated in the canister 100 (operation S150) also diagnoses the failure of the active purge pump 300 based on the aspect of the non-linear change of the signal generated by the pressure sensor 762 in a state where the PCSV 400 has been open. Further, the detection of whether the leak has been generated in the canister 100 (operation S150) determines that there is the leak in the fuel tank (T) when it is determined that there is no leak in the canister 100.

According to the leak diagnosis system using the active purge pump and the leak diagnosis method using the active purge pump according to an exemplary embodiment of the present disclosure configured as described above, it may be possible to pressurize and inject the evaporated gas into the intake pipe (I) through the adjustment of the RPM of the active purge pump 300 and the opening amount of the PCSV 400, and to detect the leak of the fuel system including the fuel tank (T) and the canister 100 through the adjustment of the rotation direction or the adjustment of the RPM of the active purge pump 300, the change in the flow path of the ELCM module 700. In addition, it may be possible to diagnose the leak of the fuel system even when the engine is stopped.

What is claimed is:

1. An evaporated gas leak diagnosis method using an active purge pump, comprising:
   diagnosing, by a controller, a failure of an active purge pump based on a signal generated by a pressure sensor installed on a vent line that extends from a canister in a fuel system to the atmosphere,
   wherein the active purge pump is mounted on a purge line that connects the canister with an intake pipe.

2. The evaporated gas leak diagnosis method using the active purge pump of claim 1, wherein the active purge pump is operated in reverse rotation to guide air from the canister toward the atmosphere.

3. The evaporated gas leak diagnosis method using the active purge pump of claim 1, wherein the diagnosis is performed while detecting a leak of the evaporated gas in the fuel system.

4. The evaporated gas leak diagnosis method using the active purge pump of claim 3, wherein the detecting of the leak of the evaporated gas in the fuel system includes:
measuring, by the controller, an atmosphere pressure using the pressure sensor;
measuring, by the controller, a first reference pressure value by circulating the air inside the vent line; and
measuring, by the controller, a leak determination value by discharging the air inside the canister and a fuel tank to the outside,
wherein in the detecting of the leak of the evaporated gas in the fuel system, the active purge pump is operated in reverse rotation to guide the air from the canister toward the atmosphere.

5. The evaporated gas leak diagnosis method using the active purge pump of claim 4, wherein after measuring the leak determination value, the diagnosing of the failure of the active purge pump is performed.

6. The evaporated gas leak diagnosis method using the active purge pump of claim 5, wherein after measuring leak determination value, the failure of the active purge pump is diagnosed based on a change in the signal generated by the pressure sensor in a state where a purge control solenoid valve (PCSV) has been open.

7. The evaporated gas leak diagnosis method using the active purge pump of claim 1, further comprising:
before detecting the leak of the evaporated gas in the fuel system, determining, by the controller, whether an engine has been stopped.

8. The evaporated gas leak diagnosis method using the active purge pump of claim 1, further comprising:
before detecting the leak of the evaporated gas in the fuel system, determining, by the controller, whether an intake air compressor has been stopped.

9. A leak diagnosis method using an active purge pump, comprising:
operating, by a controller, in reverse rotation an active purge pump mounted on a purge line for connecting a canister with an intake pipe;
determining, by the controller, whether an absolute value of the internal pressure of a fuel tank is less than a specific value; and
checking, by the controller, a leak of evaporated gas in a fuel system having the canister and the fuel tank,
when the absolute value of the internal pressure of the fuel tank is greater than the specific value, detecting, by the controller, the leak has been generated in the canister; and
in response to determining that there is no leak in the canister, determining, by the controller, that the leak is generated in the fuel tank.

10. The leak diagnosis method using the active purge pump of claim 9, further comprising:
in response to determining that the leak is generated in the fuel system, detecting, by the controller, whether the leak has been generated in the canister.

11. The leak diagnosis method using the active purge pump of claim 10, further comprising:
in response to determining that there is no leak in the canister, determining, by the controller, that the leak is generated in the fuel tank.

12. The leak diagnosis method using the active purge pump of claim 9, further comprising:
before operating the active purge pump in reverse rotation, diagnosing, by the controller,
a failure of the active purge pump using a first pressure gauge or a second pressure gauge mounted on the purge line.

13. The leak diagnosis method using the active purge pump of claim 12, wherein the failure of the active purge pump is determined based on a signal generated by the first pressure gauge mounted on the front end of the active purge pump or a signal generated by the second pressure gauge mounted on the rear end thereof.

14. The leak diagnosis method using the active purge pump of claim 12, wherein an operation of the active purge pump is prohibited in response to detecting the failure of the active purge pump.

15. The leak diagnosis method using the active purge pump of claim 9, wherein the diagnosing of the failure of the active purge pump from a signal generated by a pressure sensor installed on a vent line is performed while detecting the leak of the evaporated gas in the fuel system.

16. The leak diagnosis method using the active purge pump of claim 15, wherein the failure of the active purge pump is diagnosed based on a change in the signal generated by the pressure sensor in a state where a purge control solenoid valve (PCSV) has been open.

17. A leak diagnosis system using an active purge pump, comprising:
a canister connected with a fuel tank to adsorb evaporated gas;
a purge line for connecting the canister with an intake pipe;
an active purge pump and a purge control solenoid valve (PCSV) mounted on the purge line;
a vent line for connecting the canister with the atmosphere; and
an evaporative leak check monitor (ELCM) module and a filter mounted on the vent line,
wherein the evaporated gas collected in the canister is injected into the intake pipe by the forward-rotation operation of the active purge pump and the adjustment of the opening amount of the PCSV,
wherein the leak of the canister and the fuel tank is detected by the reverse-rotation operation of the active purge pump and a change in the flow path inside the ELCM module, and
wherein the active purge pump has a pressing direction or a generated vacuum pressure changed by an adjustment of a rotation direction or an adjustment of a revolutions per minute (RPM).

18. The leak diagnosis system using the active purge pump of claim 17, wherein a first pressure gauge is mounted on the purge line to be disposed between the active purge pump and the PCSV, and wherein a second pressure gauge is mounted on the purge line to be disposed between the canister and the active purge pump.

19. The leak diagnosis system using the active purge pump of claim 17, wherein the ELCM module includes:
a switching valve for changing the connection between a plurality of flow paths formed therein,
wherein the air is circulated inside the ELCM module by the vacuum pressure generated by the active purge pump at non-operation of the switching valve, and
wherein the air inside the canister and the fuel tank is discharged into the atmosphere by the vacuum pressure generated by the active purge pump at operation of the switching valve.

* * * * *